United States Patent
Lee et al.

(10) Patent No.: US 7,993,746 B2
(45) Date of Patent: Aug. 9, 2011

(54) FLAKY ALPHA-ALUMINA CRYSTALS WITH LARGE ASPECT RATIO AND A PREPARATION METHOD OF THE SAME

(75) Inventors: Jung Min Lee, Daejeon (KR); Jeong Kwon Suh, Daejeon (KR); Byung Ki Park, Daejeon (KR); Dong Uk Choe, Daejeon (KR); Gil Wan Chang, Cheongju-si (KR); Kwang Su Lim, Cheongju-si (KR); Sung Yun Jo, Chungcheongbuk-do (KR); Kwang Choong Kang, Cheongju-si (KR)

(73) Assignees: Korea Research Institute of Chemical Technology, Daejeon (KR); CQV Co., Ltd., Chungcheongbuk-do (KR)

( * ) Notice: Subject to any disclaimer, the term of this patent is extended or adjusted under 35 U.S.C. 154(b) by 163 days.

(21) Appl. No.: 12/439,165

(22) PCT Filed: Aug. 27, 2007

(86) PCT No.: PCT/KR2007/004114
§ 371 (c)(1),
(2), (4) Date: Feb. 26, 2009

(87) PCT Pub. No.: WO2008/026860
PCT Pub. Date: Mar. 6, 2008

(65) Prior Publication Data
US 2010/0015445 A1    Jan. 21, 2010

(30) Foreign Application Priority Data
Aug. 28, 2006  (KR) .................. 10-2006-0081601

(51) Int. Cl.
*B32B 5/16* (2006.01)

(52) U.S. Cl. ........................................................ 428/402
(58) Field of Classification Search .................. None
See application file for complete search history.

(56) References Cited

U.S. PATENT DOCUMENTS
6,287,353 B1 * 9/2001 Celikkaya ..................... 51/309

FOREIGN PATENT DOCUMENTS
| JP | 07-331110 A | 12/1995 |
| JP | 07331110 A * | 12/1995 |
| JP | 2003-064315 A | 3/2003 |
| JP | 2005-082441 A | 3/2005 |
| KR | 10-2005-0025126 A | 4/2004 |
| KR | 100619248 B | 8/2006 |

* cited by examiner

*Primary Examiner* — Mark Ruthkosky
*Assistant Examiner* — Gary Harris
(74) *Attorney, Agent, or Firm* — Frommer Lawrence & Haug LLP; Ronald R. Santucci

(57) ABSTRACT

The present invention relates to flaky alpha-alumina crystals with large aspect ratio and its preparation method, and particularly to flaky alpha-alumina crystals comprising aluminum oxide, zinc oxide and tin oxide, which are prepared by obtaining a mixed gel which are prepared by obtaining a mixed gel by means of hydrolysis of an aqueous aluminum precursor solution comprising aqueous flux, aqueous zinc precursor solution and tin precursor aqueous solution, followed by aging, drying and crystallization processes. The crystals herein have an average particle thickness of 0.5 μm or less, an average particle diameter of 30 μm or higher and an aspect ratio of 100 or higher, thus being useful as a substrate of high quality pearlescent pigments, an abrasive, ceramic material and a filling material.

9 Claims, 1 Drawing Sheet

[Figure 1]
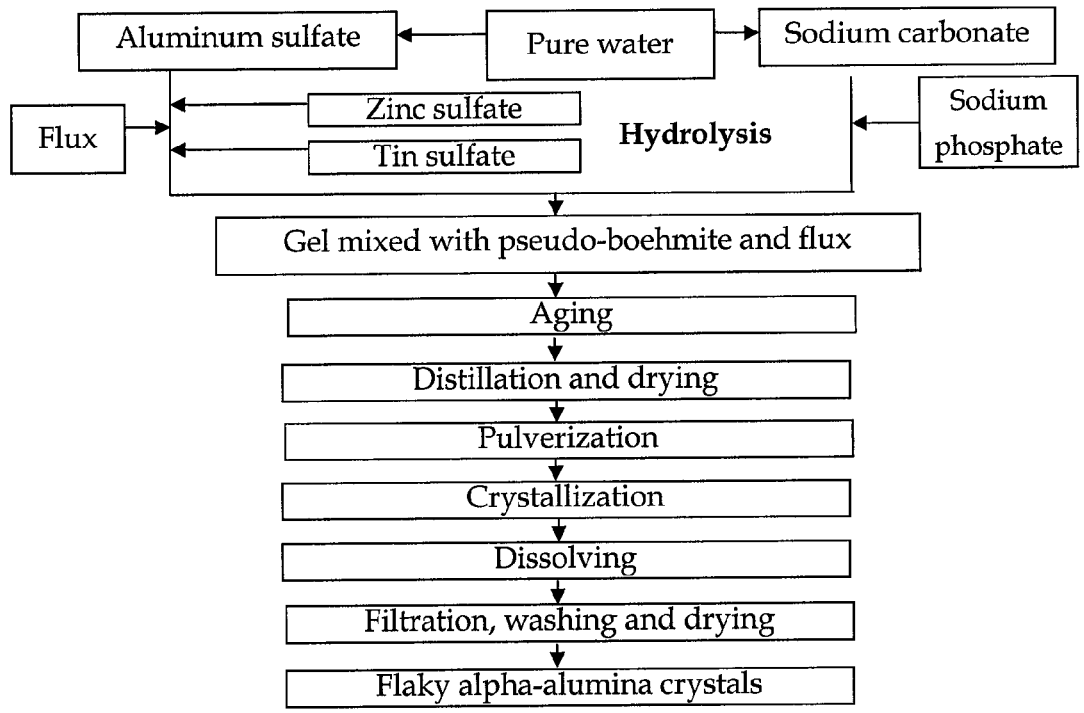
[Figure 2]
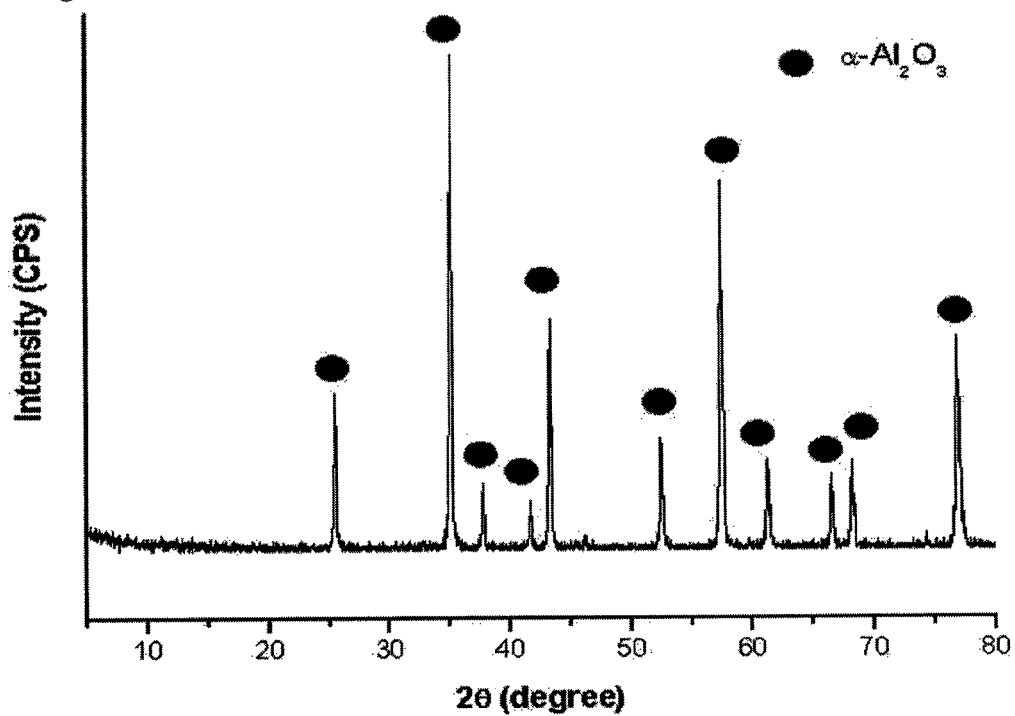

US 7,993,746 B2

FLAKY ALPHA-ALUMINA CRYSTALS WITH LARGE ASPECT RATIO AND A PREPARATION METHOD OF THE SAME

This application is a 371 of PCT/KR2007/004114 filed on Aug. 27, 2007, published on Mar. 6, 2008 under publication number WO 2008/026860 A1 which claims priority benefits from South Korean Patent Application Number 10-2006-0081601 filed Aug. 28, 2006, the disclosure of which is incorporated herein by reference.

TECHNICAL FIELD

The present invention relates to flaky alpha-alumina crystals with large aspect ratio and its preparation method, and particularly to flaky alpha-alumina crystals comprising aluminum oxide, zinc oxide and tin oxide, which are prepared by obtaining a mixed gel which are prepared by hydrolysis of an aqueous aluminum precursor solution comprising aqueous flux, aqueous zinc precursor solution and tin precursor aqueous solution, followed by aging, drying and crystallization processes. The crystals herein have an average particle thickness of 0.5 µm or less, an average particle diameter of 30 µm or higher and an aspect ratio of 100 or higher, thus being useful as a substrate of high quality pearlescent pigments, an abrasive, ceramic material and a filling material.

BACKGROUND ART

Ceramics refer to non-metal inorganic solid material prepared by thermal treatment at a high temperature, and are superior in resistance to fire, acidity and alkalinity. Substrate for ceramic material, abrasive material, filling material and pearlescent pigments should have a flaky shape, uniform size and thickness, smooth surface and relatively low agglomeration between particles.

Improvements of thermal conductivity and mechanical strength are necessary for being used as ceramic material and filling material. For this purpose, thin thickness and uniform particle size are required, and agglomeration should be lowered for homogeneous dispersion and distribution.

Important properties in pearlescent pigments as a substrate are particle size, shape, surface property and a refractive index. That is, uniform particle size is necessary for achieving clear colors because the ratio of reflected light to transmitted light are different between large-sized particles and small-sized particles. Further, the particle size is closely related to the wavelength of light, and greatly affects the tinting strength of pearlescent pigments.

Surface area increases with the decrease of the particle size, thereby increasing tinting strength and reflectivity and thus producing clear colors. However, it is difficult to uniformly coat small-sized particles with a metal or metal oxide, and the small size may decrease the effect of light interference and deteriorate the pearl gloss. Therefore, particles are preferred to have sufficiently uniform size for expression of various pearl gray colors.

The substrate in pearlescent pigments should also be transparent particles that have a uniform thickness and a smooth surface because these properties affect the expression of pearl gray color such as tinting strength and hiding power. When the thickness of particles is not uniform or surface is not smooth, most light reflects or scatters on the surface. Agglomeration of particles and non-uniform thickness also inhibit the expression of various pearl gray colors when the particles are coated with a metal or metal oxide.

Therefore, for being useful in pearlescent pigments, flaky alpha-alumina crystals should be transparent flaky particles that have an average particle thickness of 0.5 µm or less; an average particle size of 15 µm or higher, while having very smooth surface without causing agglomeration.

Examples of the conventional substrate of pearlescent pigments include lead carbonate, bismuth oxychloride (BiOCl) and natural or synthetic mica. The mica is also used as a reinforcing agent for improving the ductility and mechanical property of ceramic material or as an additive for improving thermal conductivity.

Meanwhile, the flaky alumina substrate has been conventionally prepared by using a hydrothermal method or by using titanium dioxide or tin dioxide as additives for being used as a substrate of pearlescent pigments.

The hydrothermal method has problems of small particle size and low large aspect ratio. The method of titanium dioxide addition comprises no aging process and thus it is difficult to obtain flaky alpha-alumina crystals with uniform particle size and superior dispersity despite superior properties in a substrate of pearlescent pigments. The tin dioxide method results in relatively high thickness despite large size.

Therefore, aluminum solution is hydrolyzed into a pseudo-boehmite normally according to solution chemistry method. The pseudo-boehmite undergoes phase transition into gamma-alumina ($\gamma$-$Al_2O_3$) at above 400° C. Hexagonal flaky crystals may be formed by changing the gamma-alumina ($\gamma$-$Al_2O_3$) into alpha-alumina in molten salt solution by means of heat treatment to 1,200° C.

The flaky alpha-alumina crystals should have thin and uniform plane, a large aspect ratio (=diameter/thickness) of 50 or higher along with transparency so that it may show pearlescent gloss effect of various colors when coated with a metal or metal oxide.

However, the conventional flaky crystals have a relatively low large aspect ratio due to large thickness, and thus fail to show superior properties as a substrate of pearlescent pigments.

The present inventors have filed a patent application directed to flaky alpha-alumina crystals comprising aluminum oxide and zinc oxide as an essential ingredient and a method of their preparation as a result of search on flaky alpha-alumina crystals with large aspect ratio [Korean Patent Application No. 2005-25126]. Thus prepared flaky alpha-alumina crystals have a thickness of 0.1-0.5 gm, a diameter of 15-25 µm and a large aspect ratio of 50-250.

[Disclosure]
[Technical Problem]

Therefore, the present inventors have exerted extensive researches to overcome the morphological problems of flaky alumina crystals, widely used as a substrate of the conventional pearlescent pigments, and particularly to improve the aspect ratio of the flaky alpha-alumina crystals disclosed in Korean patent application No. 2005-25126 filed by the present inventors. As a result, they found that flaky alpha-alumina crystals that comprise aluminum oxide, zinc oxide and tin oxide as an essential ingredient at a predetermined weight ratio may have an average particle thickness of 0.5 µm or less; an average particle diameter of 30 µm or higher and particularly an aspect ratio of 100 or higher. They also found that the flaky alpha-alumina crystals may be prepared by preparing a mixed gel by means of hydrolysis of an aqueous aluminum precursor solution containing aqueous flux, aqueous zinc precursor solution and tin precursor aqueous solution, and conducting aging, drying and crystallization processes under predetermined conditions, thereby finally completing the present invention.

Accordingly, the present invention aims to provide flaky alpha-alumina crystals comprising aluminum oxide, zinc oxide and tin oxide as an essential ingredient, and their preparation method.

[Technical Solution]

[Advantageous Effects]

DESCRIPTION OF DRAWINGS

FIG. 1 schematically shows a process of flaky alpha-alumina crystals according to the present invention.

FIG. 2 shows an X-ray diffraction pattern of the flaky alpha-alumina crystals prepared in Example 1.

BEST MODE

The present invention relates to flaky alpha-alumina crystals comprising aluminum oxide, zinc oxide and tin oxide as an essential ingredient.

Further, the present invention relates to a process of preparing flaky alpha-alumina crystals comprising:
(a) preparing a metal precursor aqueous solution by mixing an aqueous aluminum precursor solution comprising an aqueous flux with a precursor aqueous solution comprising 0.05-5 weight parts of a zinc precursor and 0.01-0.5 weight parts of a tin precursor relative to 100 weight parts of the aluminum precursor;
(b) preparing a mixed gel by the titration of the metal precursor aqueous solution with a sodium salt aqueous solution to adjust pH to 6.0-7.5, and conducting a hydrolysis;
(c) pretreating the mixed gel by aging the mixed gel at 60-100° C. for 5-30 hours, and drying the aged mixed gel;
(d) drying the pretreated a mixed gel at 60-200° C. for 5-30 hours;
(e) preparing a cake mixed flaky alpha-alumina crystals and flux by crystallizing the dried mixed gel at 850-1,300° C. for 1-8 hours; and
(f) preparing an alpha-alumina crystal by cooling the cake to room temperature, removing the flux by dissolving the cake in a water at 20-90° C., followed by filtration; and dispersing the filtrate in 0.1-30% sulfuric acid solution at 20-90° C., followed by filtration, washing and drying.

Hereunder is provided a detailed description of the present invention.

The present invention relates to novel flaky alpha-alumina crystals comprising aluminum oxide and zinc oxide and tin oxide at a predetermined weight ratio. The zinc oxide and the tin oxide are distributed on the surface of aluminum crystals, thereby promoting the decrease in thickness and the growth of particle and preventing the agglomeration. Flaky alpha-alumina crystals herein have an average particle thickness 0.5 μm or less, preferably 0.1-0.3 μm; an average particle diameter of 30 μm or higher, preferably 30-70 μm; an aspect ratio of 100 or higher, preferably 100-500, more preferably 150-300, thus being useful as a substrate of pearlescent pigments.

The flaky alumina crystals herein were developed in the course of improving the invention disclosed in Korean Patent Application No. 2005-25126 filed by the present inventors, particularly improving aspect ratio, which determines optical or other physical properties. Tin oxide, introduced as an essential ingredient for this purpose, is distributed on the surface of alumina along with zinc oxide, and is effective in promoting the growth of flaky particles in the diameter direction as compared to the zinc oxide alone as conventionally used. This is because it increases the growth energy of crystals in the diameter direction (i.e., $(2\bar{1}\bar{1}0)$, $(11\bar{2}0)$, $(\bar{1}2\bar{1}0)$ planes) and facilitates the arrangement of aluminum atom and oxygen atom, i.e., units of crystal growth, in the length direction of crystals.

Hereunder is provided a detailed description of flaky alpha-alumina crystals as illustrated in FIG. 1.

First, a metal precursor aqueous solution is prepared by mixing an aqueous aluminum precursor solution comprising an aqueous flux with an aqueous zinc precursor solution and a tin precursor solution.

Any conventional aluminum precursor may be used as the aluminum precursor in the present invention, and examples of the aluminum precursor include without limitation an acid salt, a halide and an oxide of aluminum, specifically aluminum sulfate, aluminum nitrate and aluminum chloride. Any conventional zinc precursor may be used as the zinc precursor in the present invention, and examples of the zinc precursor include without limitation an acid salt, a halide and an oxide of zinc, specifically zinc sulfate, zinc nitrate and zinc chloride. Any conventional tin precursor may be used as the tin precursor in the present invention, and examples of the tin precursor include without limitation an acid salt, a halide and an oxide of tin, specifically tin sulfate, tin nitrate and tin chloride.

In the present invention, aluminum sulfate is selected among these examples considering its properties relating to hydrolysis, chemical affinity with flux and easy separation from flaky crystals in water after crystallization. As other precursors, zinc sulfate and tin sulfate are selected considering chemical affinity with the aluminum sulfate and superiority in preventing the thickness decrease and agglomeration of flaky crystals. Zinc sulfate and tin sulfate oxidize into zinc oxide and tin oxide, respectively, at the temperature of 300° C. or higher. Zinc oxide and tin oxide attach to crystal surface of flaky alpha-alumina during the crystallization. Thus, the growth of a plane with relatively high surface energy, i.e., (0001) plane, is inhibited, while the growth of planes with relatively lower surface energy, i.e., $(2\bar{1}\bar{1}0)$, $(11\bar{2}0)$, $(\bar{1}2\bar{1}0)$ planes, is promoted (epitaxial growth). Therefore, the growth in the thickness direction is inhibited while the growth in the diameter direction is promoted, thus enabling to produce flaky alumina crystals having remarkably increased diameter along with similar thickness as compared to flaky alumina crystals prepared by using zinc oxide only. Further, flaky alpha-alumina crystals having various large aspect ratios may be prepared because the zinc oxide and tin oxide may have various thickness and size depending on the used amount.

The aluminum precursor, zinc precursor and tin precursor are used in the state of an aqueous solution preferably in the amount of 15-35 wt %, 20-50 wt % and 10-18 wt %, respectively. When the amount is outside the aforementioned ranges, it may be difficult to conduct hydrolysis and drying process, to prevent the agglomeration of flaky alpha-alumina crystals and to control the size and aspect ratio.

The zinc precursor is used in the amount of 0.05-5 weight parts relative to 100 weight parts of the aluminum precursor. When the amount is less than 0.05 weight parts, it is difficult to prevent the agglomeration of flaky alpha-alumina crystals, thus resulting in increased thickness and decreased aspect ratio. When the amount is more than 5 weight parts, zinc oxide may act as impurities during the crystallization, and promote heterogeneous nucleation, thus increasing the production of small-sized crystals.

The tin precursor is used in the amount of 0.01-0.5 weight parts relative to 100 weight parts of the aluminum precursor. When the amount is less than 0.01 weight parts, it is difficult to increase the size of flaky alpha-alumina crystals. When the amount is higher than 0.5 weight parts, the aspect ratio may decrease due to the increase in thickness of alpha-alumina crystals.

Further, the aqueous flux changes the solid phase into a liquid phase, where nucleation and growth are relatively easy. Mechanism of nucleation and growth in molten salt are as follows. Solute molecules or atoms agglomerate to form seeds, followed by nucleation and growth under the control of surface free energy and volume free energy.

The nucleation of flaky alpha-alumina crystals may be divided into a homogeneous nucleation and a heterogeneous nucleation. The homogeneous nucleation is caused by the diffusion of atoms depending on the super-saturation of solution in molten salt solution. The heterogeneous nucleation happens on a container comprising solution or on the surface of solid or impurities.

The nucleation of flaky alpha-alumina crystals proceeds heterogeneously as in the nucleation of other materials. The activation energy is relatively lower in heterogeneous nucleation because the interfacial energy is decreased when the nucleation happens on solid surface such as crucible surface and impurity particle surface.

The activation energy in heterogeneous nucleation varies greatly depending on the wetting angle of a solution on solid surface, and the nucleation may become easier at low wetting angle.

However, nucleation may not be easily caused although wetting angle is small because chemical affinity or physical property on the surface is a more important factor than the wetting angle. Therefore, nucleation may be facilitated if there are fine pores or grooves on the solid surface or chemical affinity between nucleus and the solid surface.

There are two types of heterogeneous nucleation. One is the nucleation and growth on crucible surface and impurity particle surface, and the other is growth in a certain direction called an epitaxial direction.

Any conventional aqueous flux may be used in the present invention. The aqueous flux is superior in chemical affinity with aluminum precursor, easily forms molten salt even at a relatively lower temperature and may be easily dissolved in water after crystallization. Examples of the aqueous flux include without limitation sodium sulfate, potassium sulfate, potassium hydrogen sulfate, sodium borate, potassium nitrate and potassium hydroxide. The aqueous flux is preferably used in the amount of 80-120 weight parts relative to 100 weight parts of aluminum precursor. When the amount is less than 80 weight parts, the formation of molten salt and the growth of flaky alpha-alumina crystals may be difficult. When the amount is more than 120 weight parts, the size and the large aspect ratio of flaky alpha-alumina crystals may decrease.

As a next step, the metal precursor aqueous solution is titrated with sodium salt aqueous solution to pH 6.0-7.5, followed by hydrolysis, thereby proving mixed gel.

Any conventional sodium salt aqueous solution may be used in the present invention. Examples of the sodium salt include without limitation sodium carbonate, sodium bicarbonate, sodium hydroxide, sodium phosphate and a mixture thereof.

The mixed gel is aged and dried. The aging is conducted at 60-100° C. for 5-30 hours. When the temperature is lower than 60° C., the growth of pseudo-boehmite contained in the mixed gel may be difficult. When the temperature is higher than 100° C., the morphological change of pseudo-boehmite may be caused by hydrothermal reaction, and the formation of flaky crystals may be difficult. When the aging time is less than 5 hours, homogeneous mixed gel may not be obtained, and the growth of pseudo-boehmite is inhibited, thereby causing serious agglomeration of flaky alpha-alumina crystals. In contrast, when the aging time is more than 30 hours, flaky alpha-alumina crystals with a large thickness may be obtained due to excessive growth of pseudo-boehmite.

The above mixing, hydrolysis, and aging processes facilitate the generation and growth of pseudo-boehmite and a uniform dispersion of a mixed gel. Further, the crystallization process enables to form flaky bodies due to the agglomeration of needle-shaped gamma-alumina crystals and disperse zinc oxides and tin oxides on the surface of flaky alpha-alumina crystals, thereby facilitating the decrease in thickness, growth of particles and prevent agglomeration.

The drying is conducted at 60-200° C. for 5-30 hours. When the temperature is lower than 60° C., the drying may not be sufficient. When the temperature is higher than 200° C., hard dried gel may be formed due to excessive drying shrinkage of the mixed gel, and heterogeneous flaky crystals may be formed due to the agglomeration of pseudo-boehmite.

The dried mixed gel is crystallized at 850-1,300° C. for 1-8 hours. When the temperature is lower than 850° C., the formation of flaky alpha-alumina crystals may be difficult. When the temperature is higher than 1,300° C., sulfur constituting the flux may be separated, and the difficulty in maintaining a molten salt may cause the agglomeration of flaky crystals and also increase the production cost.

The crystallization is conducted so that flaky crystals having a sufficient size may be formed by the agglomeration of needle-shaped particles before the phase transition to alpha-alumina by forming a homogeneous molten salt without temperature gradient.

The crystallized cake is cooled, washed and dried according to the conventional method. In the present invention, flaky alpha-alumina crystals are prepared by cooling the cake to room temperature and dispersing the cake at 20-90° C. with 0.1-30% sulfuric acid solution, followed by filtration, washing and drying processes. When the concentration of the sulfuric acid solution is lower than 0.1%, the dispersion of the flaky alpha-alumina crystals may be difficult. When the concentration is higher than 30%, the dispersing effect may level off while increasing the cost for discharging waste solution.

Thus prepared flaky alpha-alumina crystals, which comprises aluminum oxide as a main ingredient and zinc oxide as an auxiliary ingredient at a predetermined weight ratio, have an average particle thickness of 0.5 µm or less; an average particle size of 30 µm or higher; and a large aspect ratio of 100 or higher.

MODE FOR INVENTION

The present invention is described more specifically by the following Examples. Examples herein are meant only to illustrate the present invention, however, they should not be construed as limiting the scope of the claimed invention.

Example 1

Homogeneous mixture solution was prepared by mixing 670 g of aluminum sulfate ($Al_2(SO_4)_3 \cdot 18H_2O$), 345 g of sodium sulfate ($Na_2SO_4$), 280 g of potassium sulfate ($K_2SO_4$), 4.8 g of 34% zinc sulfate ($ZnSO_4 \cdot 7H_2O$) aqueous solution and 1.0 g of 17% zinc sulfate ($ZnSO_4 \cdot 7H_2O$) aqueous solution in a reactor (5 L) containing 1,900 mL of purified water at 65° C. Alkaline solution was prepared by dissolving 324 g of sodium carbonate ($Na_2CO_3$) and 2.7 g of sodium phosphate (($NaPO_3)_6$) in 900 mL of distilled water at 65° C. A gel mixed with pseudo-boehmite and flux was prepared by the titration of the aluminum sulfate mixture solution (65° C.)

while stirring with the alkaline solution at the rate of 25 mL/min to adjust the final pH to 6.8. The mixed gel was aged at 90° C. for 20 hours, vacuum-distilled at 60° C., and dried at 110° C. for 20 hours. Flaky alpha-alumina crystals were prepared by pulverizing the dried mixed gel to about less than 5 mm, and conducting crystallization in an alumina crucible (2 L) at 1,200° C. for 7 hours. The flux was separated from the flaky alpha-alumina crystals by cooling the crucible to room temperature and dissolving the flux with warm water (60° C.), followed by filtration. The crystals were completely dispersed by placing the separated flaky alpha-alumina crystals in a reactor (5 L) along with 3 L of 10% sulfuric acid solution, and stirring the mixture at 60° C. for 48 hours.

The dispersed solution was filtered, washed and dried at 100° C., thus providing transparent flaky alpha-alumina particles having an average particle thickness of 0.22 μm and an average particle size of 35.8 μm. X-ray diffraction analysis ascertains the production of alpha-alumina crystals, and atom analysis shows that 0.4 weight parts of zinc oxide and 0.09 weight parts of tin oxide were contained.

Example 2

Transparent flaky alpha-alumina crystals were prepared same as in Example 1 except that 0.5 g of 17% tin sulfate was used.

The prepared flaky alpha-alumina crystals were ascertained to have an average particle thickness of 0.2 μm and an average particle size of 32.8 μm. Atom analysis shows that 0.4 weight parts of zinc oxide and 0.04 weight parts of tin oxide were contained.

Example 3

Transparent flaky alpha-alumina crystals were prepared same as in Example 1 except that 35% zinc sulfate (6 g) was used.

The prepared flaky alpha-alumina crystals were ascertained to have an average particle thickness of 0.18 μm and an average particle size of 32.1 μm. Atom analysis shows that 1.0 weight parts of zinc oxide and 0.09 weight parts of tin oxide were contained.

Example 4

Transparent flaky alpha-alumina crystals were prepared same as in Example 3 except that 17% tin sulfate (1.0 g) was used.

The prepared flaky alpha-alumina crystals were ascertained to have an average particle thickness of 0.17 μm and an average particle size of 31.5 μm. Atom analysis shows that 1.0 weight parts of zinc oxide and 0.09 weight parts of tin oxide were contained.

Comparative Example 1

Transparent flaky alpha-alumina crystals were prepared same as in Example 1 except that 3 g of 17% tin sulfate was used instead of zinc sulfate.

The prepared flaky alpha-alumina crystals were ascertained to have an average particle thickness of 1.0 μm and an average particle size 36.4 μm. Atom analysis shows that 0.27 weight parts of tin oxide was contained.

Comparative Example 2

Transparent flaky alpha-alumina crystals were prepared same as in Comparative Example 1 except that 17% tin sulfate (6.0 g) was used.

The prepared flaky alpha-alumina crystals were ascertained to have an average particle thickness of 1.5 μm and an average particle size 42.6 μm. Atom analysis shows that 0.55 weight parts of tin oxide was contained.

Comparative Example 3

Example 1 in KR Patent Application No. 2005-25126

A homogeneous mixture solution was prepared by mixing 670 g of aluminum sulfate $(Al_2(SO_4)_3.18H_2O)$, 345 g of sodium sulfate$(Na_2SO_4)$, 280 g of potassium sulfate $(K_2SO_4)$ and 6 g of 35% zinc sulfate $(ZnSO_4.7H_2O)$ aqueous solution in a reactor (5 L) containing 1,900 mL of purified water at 65° C. Alkaline solution was prepared by dissolving 327 g of sodium carbonate $(Na_2CO_3)$ and 2.7 g of sodium phosphate $((NaPO_3)_6)$ in 900 mL of distilled water at 65° C. A gel mixed with pseudo-boehmite and flux was prepared by the titration of the aluminum sulfate mixture solution (65° C.) while stirring with the alkaline solution at the rate of 25 mL/min to adjust the final pH to 6.8. The mixed gel was aged at 90 C for 20 hours, vacuum-distilled at 60° C., and dried at 110° C. for 20 hours.

The dried mixed gel was pulverized to about less than 5 mm, and calcinations was conducted in a crucible (2 L) at 500° C. for 1 hour, thereby sufficiently removing the combined water (water of crystallization). The temperature was elevated to 930° C. and was maintained for 30 minutes to promote the generation of homogeneous molten salt and the production of flaky crystals by agglomeration of needle-shaped gamma-alumina particles. Crystallization was conducted at 1,150° C. for 5.5 hours, thereby providing flaky alpha-alumina crystals. The crucible was cooled to room temperature, and the flux was separated from the flaky alpha-alumina crystals by cooling the crucible to room temperature and dissolving the flux with warm water (60° C.), followed by filtration. The separated crystals were completely dispersed by placing the separated flaky alpha-alumina crystals in a reactor (5 L) along with 3 L of 0.5% sulfuric acid solution and stirring the mixture at 60° C. for 48 hours.

The dispersed solution was filtered, washed and dried at 100° C., thus providing transparent flaky alpha-alumina particles having an average particle thickness of 0.25 μm, an average particle size of 15.6 μm. Atom analysis shows that 0.05 weight parts of zinc oxide was contained.

Thickness and average particle size of the flaky alpha-alumina crystals prepared in Examples 1-4 and Comparative Examples 1-3 are presented in Table 1.

TABLE 1

| Examples | Avg. particle thickness | Avg. particle size | Aspect ratio (Avg. size/avg. thickness) |
| --- | --- | --- | --- |
| Ex. 1 | 0.22 μm | 35.8 μm | 162 |
| Ex. 2 | 0.20 μm | 32.8 μm | 164 |
| Ex. 3 | 0.18 μm | 32.1 μm | 178 |
| Ex. 4 | 0.17 μm | 31.5 μm | 185 |
| Comp. Ex. 1 | 1.0 μm | 36.4 μm | 36 |
| Comp. Ex. 2 | 1.5 μm | 42.6 μm | 28 |
| Comp. Ex. 3 | 0.25 μm | 15.6 μm | 62 |

As shown in Table 1, the flaky alpha-alumina crystals prepared in Examples 1-4 have a particle thickness of 0.1-0.3 μm, a particle size of 31.5-35.8 μm and an aspect ratio of 160 or higher.

Further, as compared to Examples according to the present invention, Comparative Example 1 (no zinc sulfate) and Comparative Example 2 (excessive tin sulfate) show remarkably lowered aspect ratios, and Comparative Example 3 (no tin sulfate) also shows drastic decrease in particle size and aspect ratio (~62).

INDUSTRIAL APPLICABILITY

As described above, crystals herein comprises aluminum oxide and zinc oxide and tin oxide as an essential ingredient at a predetermined weight ratio, thereby facilitating the control of thickness and the size. The crystals herein have an average particle thickness of 0.5 μm or less, an average particle size of 30 μm or higher and an aspect ratio of 100 or higher, thus being useful as a substrate of high quality pearlescent pigments, ceramic material and filling material.

The invention claimed is:

1. A flaky alpha-alumina crystal comprising an aluminum oxide, a zinc oxide and a tin oxide, wherein the aluminum oxide($Al_2O_3$), the zinc oxide(ZnO) and the tin oxide(SnO) are contained in the weight ratio of 100:0.05-5:0.01-0.5, and the flaky alpha-alumina crystal has a thickness of 0.1-0.5 μm, an average diameter of 30-70 μm and an aspect ratio of 150-300.

2. A flaky alpha-alumina crystal of claim 1 produced by a process of comprising:
   (a) preparing a metal precursor aqueous solution by mixing a precursor aqueous solution comprising 0.05-5 weight parts of a zinc precursor and 0.01-0.5 weight parts of a tin precursor with an aqueous aluminum precursor solution comprising an aqueous flux relative to 100 weight parts of the aluminum precursor;
   (b) preparing a mixed gel by the titration of the metal precursor aqueous solution with a sodium salt aqueous solution to adjust pH to 6.0-7.5, and conducting a hydrolysis;
   (c) pretreating the mixed gel by aging the mixed gel at 60-100° C. for 5-30 hours, and drying the aged mixed gel;
   (d) drying the pretreated a mixed gel at 60-200° C. for 5-30 hours;
   (e) preparing a cake mixed flaky alpha-alumina crystals and flux by crystallizing the dried mixed gel at 850-1,300° C. for 1-8 hours; and
   (f) preparing an alpha-alumina crystal by cooling the cake to room temperature; removing the flux by dissolving the cake in a water at 20-90° C., followed by filtration; and dispersing the filtrate in 0.1-30% sulfuric acid solution at 20-90° C., followed by filtration, washing and drying.

3. The flaky alpha-alumina crystal of claim 2, wherein the aluminum precursor is selected from the group consisting of an acid salt, a halide and an oxide of aluminum.

4. The flaky alpha-alumina crystal of claim 2, wherein the zinc precursor is selected from the group consisting of an acid salt, a halide and an oxide of zinc.

5. The flaky alpha-alumina crystal of claim 2, wherein the tin precursor is selected from the group consisting of an acid salt, a halide and an oxide of tin.

6. The flaky alpha-alumina crystal of claim 2, wherein the aqueous flux is selected from the group consisting of sodium sulfate, potassium sulfate, potassium hydrogen sulfate, sodium borate, potassium nitrate, potassium hydroxide and a mixture thereof.

7. The flaky alpha-alumina crystal of claim 2, wherein the aqueous flux is contained in the amount of 80-120 weight parts relative to 100 weight parts of the aluminum precursor.

8. The flaky alpha-alumina crystal of claim 2, wherein the sodium salt is selected from the group consisting of sodium carbonate, sodium bicarbonate, sodium hydroxide, sodium phosphate and a mixture thereof.

9. The flaky alpha-alumina crystal of claim 5, wherein the aqueous flux is contained in the amount of 80-120 weight parts relative to 100 weight parts of the aluminum precursor.

* * * * *